US009426188B2

(12) United States Patent
Podal et al.

(10) Patent No.: US 9,426,188 B2
(45) Date of Patent: Aug. 23, 2016

(54) APPARATUS AND METHOD FOR CONFERENCING

(75) Inventors: Jon Podal, Bromma (SE); Ruben Laguna-Macias, Sollentuna (SE); Farooq Rabbani, Sundbyberg (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 116 days.

(21) Appl. No.: 14/345,619

(22) PCT Filed: Oct. 13, 2011

(86) PCT No.: PCT/SE2011/051227
§ 371 (c)(1),
(2), (4) Date: Mar. 18, 2014

(87) PCT Pub. No.: WO2013/055270
PCT Pub. Date: Apr. 18, 2013

(65) Prior Publication Data
US 2014/0355490 A1 Dec. 4, 2014

(51) Int. Cl.
*H04L 12/26* (2006.01)
*H04L 29/06* (2006.01)
(Continued)

(52) U.S. Cl.
CPC .......... *H04L 65/1093* (2013.01); *H04L 12/189* (2013.01); *H04L 12/1818* (2013.01);
(Continued)

(58) Field of Classification Search
CPC ............ H04L 12/1818; H04L 12/2807; H04L 29/12594; H04L 65/1006; H04L 61/3085; H04Q 2213/1324
USPC ......... 370/261, 331; 709/227, 249; 348/14.09
See application file for complete search history.

(56) References Cited

U.S. PATENT DOCUMENTS 7,184,418 B1 * 2/2007 Baba et al. ..................... 370/331
2004/0246332 A1 * 12/2004 Crouch ............... H04L 12/1822
348/14.08

(Continued)

FOREIGN PATENT DOCUMENTS

CN 1679287 A 10/2005
CN 101159787 A 4/2008
(Continued)

OTHER PUBLICATIONS

PCT International Search Report for PCT Counterpart Application No. PCT/SE2011/051227, Apr. 27, 2012, 4 pages.
(Continued)

*Primary Examiner* — Wanda Z Russell
(74) *Attorney, Agent, or Firm* — NDWE LLP

(57) ABSTRACT

Example embodiments presented herein are directed towards a network node, and corresponding method, for conference handling. The method comprises receiving an invitation, from an initiating user equipment, to create an Internet Protocol Multimedia Subsystem (IMS) conference, the invitation comprising a Uniform Resource Identifier (URI) associated with the initiating user equipment. The method further comprises obtaining a conference focus identifier associated with a conference focus unit hosting the IMS conference, and compiling a mapping of the URI and the conference focus identifier. The method also comprises receiving, from a participating user equipment, a communication request comprising the URI associated with the initiating user equipment, and forwarding, based on the mapping, the participating user equipment to the IMS conference associated with the conference focus identifier.

27 Claims, 8 Drawing Sheets

(51) Int. Cl.
*H04L 29/12* (2006.01)
*H04M 3/56* (2006.01)
*H04M 7/12* (2006.01)
*H04L 12/18* (2006.01)
*H04M 3/42* (2006.01)

(52) U.S. Cl.
CPC .......... *H04L61/106* (2013.01); *H04L 61/3085* (2013.01); *H04L 61/605* (2013.01); *H04L 65/1016* (2013.01); *H04L 65/1069* (2013.01); *H04L 65/403* (2013.01); *H04M 3/56* (2013.01); *H04M 7/123* (2013.01); *H04M 7/127* (2013.01); *H04M 7/128* (2013.01); *H04M 3/4228* (2013.01); *H04Q 2213/1324* (2013.01); *H04Q 2213/13204* (2013.01); *H04Q 2213/13348* (2013.01); *H04Q 2213/13389* (2013.01)

(56) References Cited

U.S. PATENT DOCUMENTS

| | | | | |
|---|---|---|---|---|
| 2007/0133517 | A1* | 6/2007 | Miller et al. | 370/352 |
| 2008/0043091 | A1* | 2/2008 | Lia et al. | 348/14.09 |
| 2008/0298294 | A1* | 12/2008 | Gonsa | H04L 12/1818 370/312 |
| 2009/0181659 | A1 | 7/2009 | Stalnacke et al. | |
| 2010/0293299 | A1* | 11/2010 | Stokking | H04L 12/2807 709/249 |
| 2011/0040836 | A1* | 2/2011 | Allen et al. | 709/205 |
| 2011/0225307 | A1* | 9/2011 | George | H04L 69/10 709/227 |
| 2012/0300677 | A1* | 11/2012 | Forsberg | H04L 65/1016 370/261 |

FOREIGN PATENT DOCUMENTS

| | | |
|---|---|---|
| WO | WO-2004/021655 A1 | 3/2004 |
| WO | WO-2005/025196 A1 | 3/2005 |
| WO | WO-2009/012807 A1 | 1/2009 |

OTHER PUBLICATIONS

PCT Written Opinion of the International Searching Authority for PCT Counterpart Application No. PCT/SE2011/051227, Apr. 27, 2012, 5 pages.

ETSI TS 124 147 V10.1.0, Technical Specification, "Digital cellular telecommunications system (Phase 2+); Universal Mobile Telecommunications System (UMTS); LTE; Conferencing using the IP Multimedia (IM) Core Network (CN) subsystem; Stage 3, (3GPP TS 24.147 version 10.1.0 Release 10)," Jun. 2011, 210 pages, downloaded from http://www.etsi.org/deliver/etsi_ts/124100_124199/124147/10.01.00_60/ts_124147v100100p.pdf on Mar. 18, 2014.

ETSI TS 124 423 V8.3.0, "Digital cellular telecommunications system (Phase 2+); Universal Mobile Telecommunications System (UMTS); LTE; TISPAN; PSTN/ISDN simulation services; Extensible Markup Language (XML) Configuration Access Protocol (XCAP) over the Ut interface for Manipulating NGN PSTN/ISDN Simulation Services (3GPP TS 24.423 version 8.3.0 Release 8)," Oct. 2011, 18 pages, downloaded from http://www.etsi.org/deliver/etsi_ts/124400_124499/124423/08.03.00_60/ts_124423v080300p.pdf on Mar. 18, 2014.

J. Rosenberg et al., "SIP: Session Initiation Protocol," Jun. 2002, 269 pages, Network Working Group, Request for Comments: 3261, The Internet Society.

H. Schulzrinne et al., "Common Policy: A Document Format for Expressing Privacy Preferences," Feb. 2007, 32 pages, Network Working Group, Request for Comments: 4745, The IETF Trust.

H. Schulzrinne, "The tel URI for Telephone Numbers," Dec. 2004, 17 pages, Network Working Group, Request for Comments: 3966, The Internet Society.

First Office Action, Chinese Application No. 201180074126.8, dated Aug. 7, 2015, 8 pages.

* cited by examiner

APPARATUS AND METHOD FOR CONFERENCING

CROSS-REFERENCE TO RELATED APPLICATIONS

This application is a National stage of International Application No. PCT/SE2011/051227, filed Oct. 13, 2011, which is hereby incorporated by reference.

TECHNICAL FIELD

Example embodiments presented herein are directed towards a network node, and method, therein for Internet Protocol Multimedia Subsystem (IMS) conference handling.

BACKGROUND

Telephone conferencing is an effective means of communication where multiple users may simultaneously participate in a call. An Internet Protocol Multimedia Subsystem (IMS) is an architectural framework for delivering Internet Protocol (IP) multimedia services. It was originally designed by the wireless standard 3rd Generation Partnership Project (3GPP), as a part of the vision for evolving mobile networks beyond the Global System for Mobile Communications (GSM). 3GPP systems comprise functionality for conferencing within the IMS based framework utilizing Session Initiation Protocol (SIP).

SUMMARY

Currently, during the establishment of an IMS conference, it is not possible to use a pre-defined telephone Uniform reference Identifier (URI) or Supplementary Service Code (SSC). Instead, a Session Internet Protocol (SIP) URI, or a focus Public Service Identity (PSI), is provided in an 'ad-hoc' manner. Furthermore, a Public Switched Telephone Network (PSTN) user is not able to call a SIP URI, PSTN users are only able to utilize telephone URIs. Currently, it is not possible to create a conference utilizing a single telephone URI for Plain Old Telephone (POT) users or for Circuit Switched (CS) users. Furthermore, current methods of conference creation require the transmission of multiple messages to establish the conference and add users to pre-existing conferences.

Thus, at least one object of the example embodiments presented herein may be to provide a way of reducing system resources when creating a telephone conference.

According to the example embodiments, the SIP URI or telephone URI for the conference creator may be used by the participants that want to call in. Because the conference URI is a regular URI for the conference creator, the regular IMS services for that user can be applied (if desired) to calls to and calls from the conference.

Utilizing the example embodiments, a PSTN user is able to create and dial into an IMS conference. According to some of the example embodiments, the establishment of a conference may be done by calling a pre configured E164 telephone number in an application server, or network node. The configuration of the number may be done by an operator or user. Conferences may therefore be network agnostic.

The participants may call into a conference by using the conference creator's E.164 number. These participants will be forwarded by the application server (AS), or network node, into the conference. Mapping from E.164 to a conference specific SIP URI may be done by the application server. Rules defined by the conference creator, or an initiating user, may be applied to the participants joining the conference. Conference creators setting for Incoming Communication Barring (ICB), Outgoing Communication Barring (OCB) and other services could be applied. Some of the example embodiments also provide for the joining of two or more conferences by a conference creator.

Thus, some of the example embodiments presented herein may be directed towards a method, in a network node, for conference handling. The method comprises receiving an invitation, from an initiating user equipment, to create an Internet Protocol Multimedia Subsystem (IMS) conference. The invitation comprises a Uniform Resource Identifier (URI) associated with the initiating user equipment. The method further comprises obtaining a conference focus identifier associated with the IMS conference, and compiling a mapping of the URI and the conference focus identifier. The method also comprises receiving, from a participating user equipment, a communication request comprising the URI associated with the initiating user equipment. The method also comprises forwarding the communication request to the IMS conference associated with the conference focus identifier, the step of forwarding being based on the mapping.

Some of the example embodiments may be directed towards a network node for conference handling. The network node comprises a receiving port configured to receive an invitation, from an initiating user equipment, to create an Internet Protocol Multimedia Subsystem (IMS) conference, the invitation comprising a Uniform Resource Identifier (URI) associated with the initiating user equipment. The network node also comprises an obtaining unit configured to obtain a conference focus identifier associated with the IMS conference, and a compiling unit configured to compile a mapping of the URI and the conference focus identifier. The receiving port is further configured to receive, from a participating user equipment, a communication request comprising the URI associated with the initiating user equipment. The network node further comprises a forwarding unit configured to forward the communication request to the IMS conference associated with the conference focus identifier, the forwarding unit being configured to forward the participating user equipment based on the mapping.

Utilizing the example embodiments presented herein a simplified creation of a conference may be achieved. The example embodiments provide for a single telephone URI that may be utilized enabling all types of users (including POT and CS) to join an existing conference with a single message request. Therefore, the example embodiments further provide a means for reducing the number of messages required in the creation of a conference and the addition of users to the conference. Thus, a reduced utilization of system resources is achieved.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

In the following description, for purposes of explanation and not limitation, specific details are set forth, such as particular components, elements, techniques, etc. in order to provide a thorough understanding of the example embodiments. However, the example embodiments may be practiced in other manners that depart from these specific details. In other instances, detailed descriptions of well-known methods and elements are omitted so as not to obscure the description of the example embodiments.

Figure 1A:
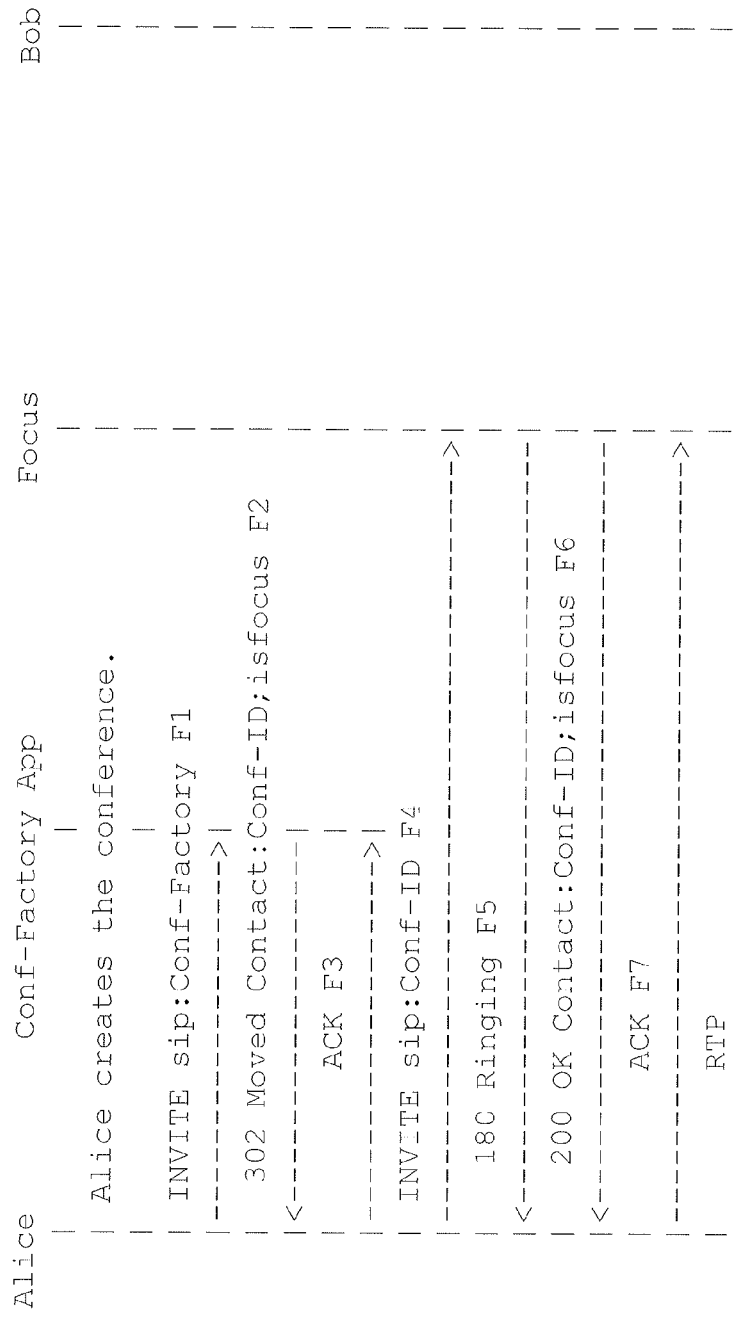
FIGS. 1A and 1B are an illustrative example of conference creation.
Figure 1B:
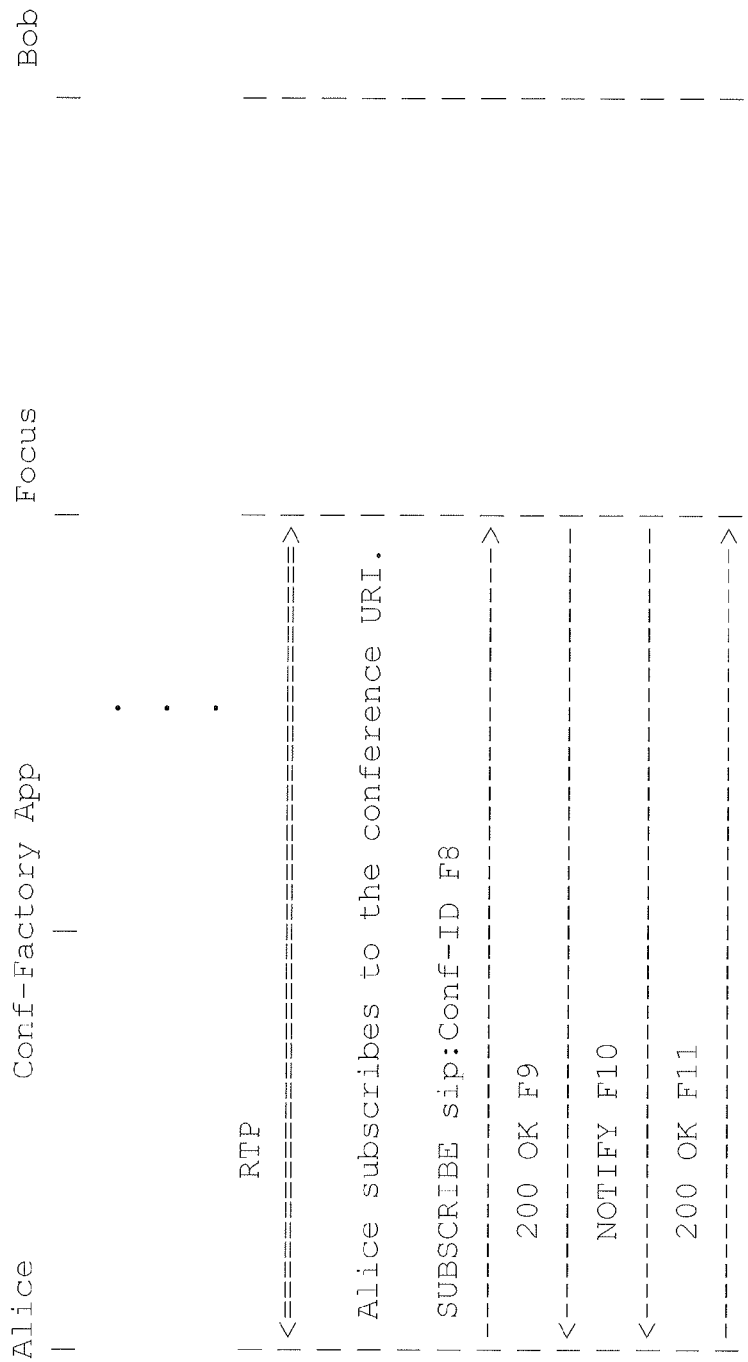

Example embodiments are presented herein to provide an improved method for IMS conferencing. As part of the solution according to the embodiments discussed herein, a problem will first be identified and discussed. FIGS. 1A and 1B illustrate an example of the creation of a conference call according to current methods. In the example provided by FIGS. 1A and 1B, a conference factory URI is used to automatically create the conference. The conference URI is created by a focus and used by conference participants. In the creation of the conference, the initiating user (Alice) must first receive a conference identifier from a conference factory application. Thereafter, the initiating user must establish the conference with the focus directly. As shown in FIGS. 1A and 1B, the establishment of the conference requires a total of 11 messages among the different network nodes (e.g., the initiating user, the conference factory application and the focus). Thus, the establishment of the conference requires a significant amount of system resources.

Figure 2A:
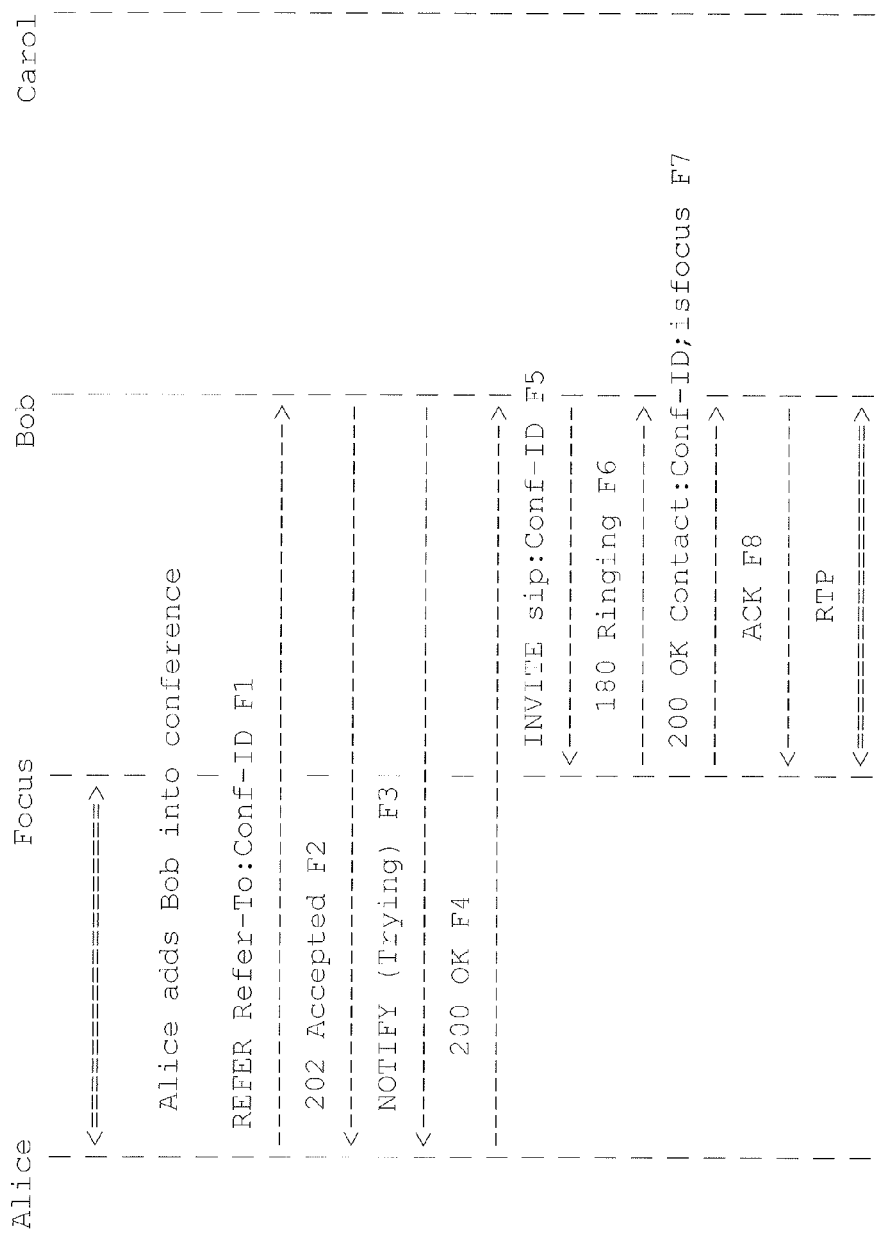
FIGS. 2A and 2B are an illustrative an example of adding a participant to an existing conference.
Figure 2B:
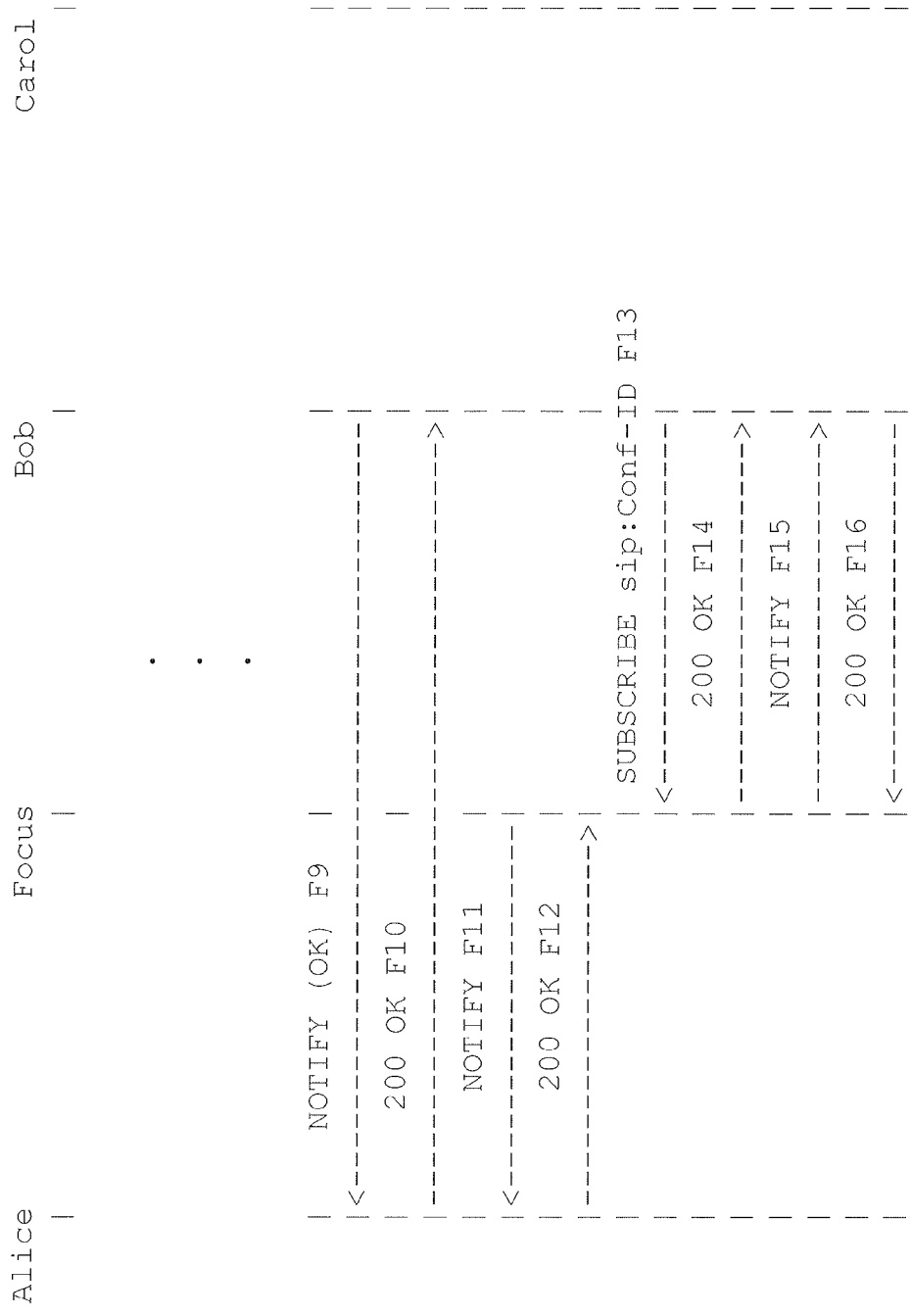

Upon establishment, different users must be individually added to the conference. An example of adding users to an existing conference is illustrated in FIGS. 2A and 2B. Different users may be added to an existing conference when the initiating user (Alice in the example provided in FIGS. 2A and 2B) sends an SIP REFER message containing URI information associated with the established conference to a user which will be added (Bob in the example provided in FIGS. 2A and 2B). The added user may then use the received conference URI to establish a connection with the focus, a procedure in which the initiating user (Alice) is also involved. As shown in FIGS. 2A and 2B, the addition of a user to an existing conference requires a total of 16 messages among the different network nodes (e.g., the initiating user, the focus, and the added user). Thus, the addition of a user to the conference also requires a significant amount of system resources.

It should be appreciated that during the establishment of a conference, it is not possible to use a pre-defined telephone URI or Supplementary Service Code (SSC). Instead, the conference factory provides a SIP URI, or a focus Public Service Identity (PSI), in an 'ad-hoc' manner. Furthermore, a Public Switched Telephone Network (PSTN) user is not able to call a SIP URI, PSTN users are only able to utilize telephone URIs. Currently, it is not possible to create a conference utilizing a single telephone URI for Plain Old Telephone (POT) users or for Circuit Switched (CS) users.

Thus, the example embodiments presented herein are directed towards a simplified creation of a conference, where a single telephone URI may be utilized enabling all types of users (including POT and CS) to join an existing conference with a single message request. Therefore, the example embodiments provide a means for reducing the number of messages required in the creation of a conference and the addition of users to the conference. Thus, the example embodiments further provide a reduced utilization of system resources.

The example embodiments also simplify the dial-in procedure for a call-in participant as the telephone number/SIP URI used to dial-in is a long-lived URI (as opposed to the random/temporary URI generated when using a conference factory) and may even be the same URI of the initiating user.

The example embodiments also solve the conference 3GPP TS 24.147 dial in problem where a conference creator sends a REFER to a participants with the contact information, temporary conf URI, received from conference focus. Usually the operator doesn't like to send REFER straight to a terminal (e.g., for security reasons). Dial-in according to 3GPP TS 24.147 is today seldom supported by operators.

Figure 3:
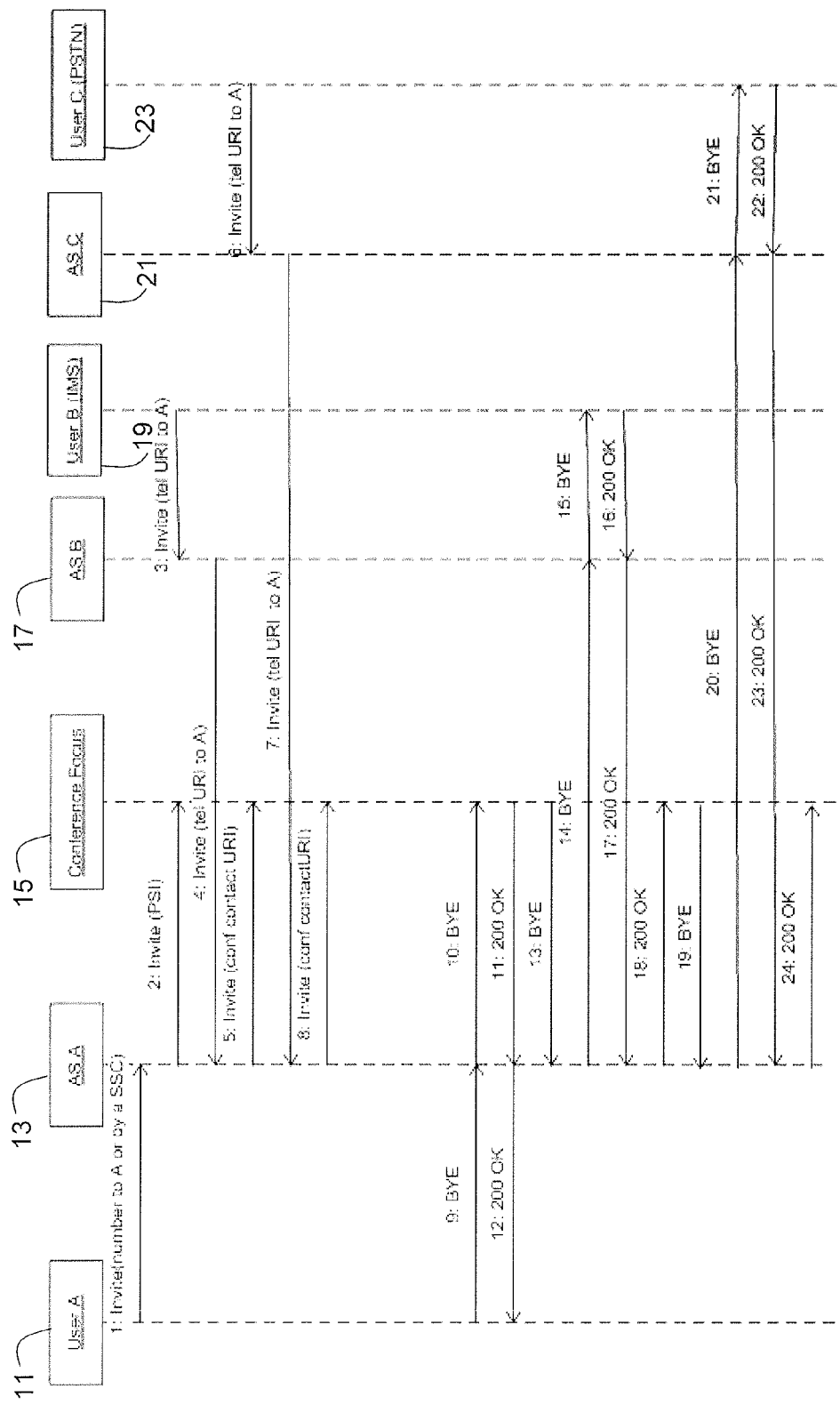
FIG. 3 is a messaging diagram of conference creation and termination, according to some of the example embodiments.

FIG. 3 is an example message sequence depicting the creation of a conference, the addition of users to the conference, and the termination of the conference, according to some of the example embodiments. In the creation of the conference, an initiating user equipment 11 (User A) may send a request to establish a conference to a network node, which may be an application server 13 (AS A) associated with the initiating user equipment 11 (message 1). In some example embodiments the request may comprise a telephone URI or SSC associated with the initiating user equipment 11. In some example embodiments, the network node 13 (AS A) associated with the initiating user equipment 11 may comprise a communication manager (CM) with the conference telephone URI associated with the initiating user pre-defined. It should be appreciated that while the network node 13 in FIG. 3 is comprised within the application server associated with the initiating user 11, the network node 13 may also be a stand alone node.

Upon receiving the request, the network node 13 may analyze the request. In the analysis of the request, the network node 13 may obtain a conference focus identifier associated with the conference call (message 2). It should be appreciated that the conference focus identifier may be obtained by any manner known in the art. Thereafter, the network node 13 may compile a mapping of the URI or SSC associated with the initiating user equipment 11 and the conference focus identifier. Thus, at this point a conference has been created with the use of only two messages.

Figure 4:
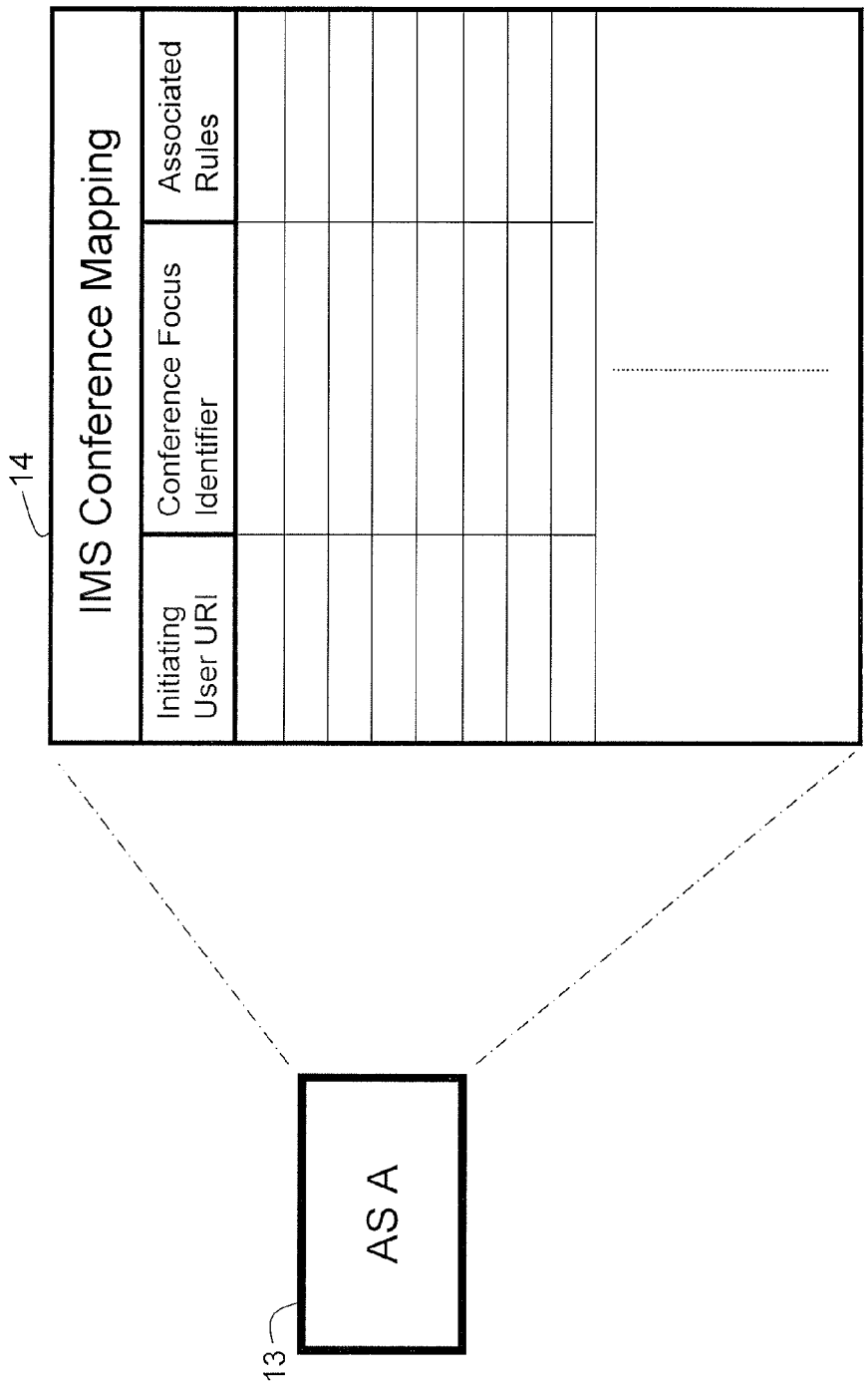
FIG. 4 is an illustrative example of a conference mapping, according to some of the example embodiments.

FIG. 4 illustrates an example of such a mapping. The network node 13 may comprise an internal mapping 14 associating the URI or SSC or an initiating conference user equipment 11 with the conference focus identifier. Furthermore, according to some example embodiments, any rules which may be associated with the conference call.

A few non-limiting examples of associated rules may be rules and/or polices defining user and/or call restrictions. The rules may be Extensible Markup Language (XML) rules based on the ETSI common policy RFC 4745 and 3GPP 24.423 V8.3.0 defining the Simulation Service (SimServ). It should be appreciated that any format or language may be used to describe the rules.

According to some of the example embodiments, a rule may be based on the media capabilities of the caller to the conference caller or initiating user. For example, a rule may provide that participating user may only be allowed in the conference call if the participating user has video based calling capabilities. An example implementation of the rule is provided below:

```
<ss:conference-rule-base>
    <cp:ruleset>
<!--If the media of the caller is video then let him join conference-->
        <cp:rule id="conference-based-on-media-of caller">
            <cp:conditions>
                <ss:media>video</ss:media>
            </cp:conditions>
            <cp:actions>
                <ss:forward-to>
```

-continued

```
        <ss:target>my number for conference</ss:target>
    </ss:forward-to>
    </cp:actions>
    </cp:rule>
    </cp:ruleset>
    </ss:conference-rule-base>
```

According to some of the example embodiments, a rule based on the identity or location of a participating user may be established. For example, a rule may provide that only participating users located in a certain region may join a conference. In the example implementation provided below, only participating users from the UK may dial into the conference. The identification of such participating users may be based on the "+44" country code for UK or an identification number associated with each participating user. An example implementation of such a rule is provided below:

```
        <ss:conference-rule-base>
        <cp:ruleset>
    <!--only callers from UK are allowed to join conference-->
            <cp:rule id="conference-based-on-only-uk-participants">
                <cp:identity>sip:+44</cp: identity>
                <cp:actions>
                <ss:forward-to>
        <ss:target>my number for conference</ss:target>
        </ss:forward-to>
        </cp:actions>
        </cp:rule>
        </cp:ruleset>
        </ss:conference-rule-base>
```

According to some of the example embodiments, a rule based on the time of day and day of the week may be provided. For example, a rule may dictate that the conference will be available or valid for Monday and Tuesday during predetermined periods of time. An example implementation of such a rule is provided below:

```
        <ss:conference-rule-base>
        <cp:ruleset>
<!--A conference for days of the week and times for those days-->
            <cp:rule id="conference-based-days-of-the-wee-and-times-during-the-day">
<cp:conditions>
    <mmt-serv:valid-periods>
            <mmt-serv:utc-offset>+05:30</mmt-serv:utc-offset>
                <mmt-serv:valid-days>
                <mmt-serv:day>Monday</mmt-serv:day>
                <mmt-serv:day>Tuesday</mmt-serv:day>
            </mmt-serv:valid-days>
            <mmt-serv:valid-times>
                <mmt-serv:interval from="09:00" until="12:00"/>
                <mmt-serv:interval from="13:00" until="17:00"/>
            </mmt-serv:valid-times>
    </mmt-serv:valid-periods>
</cp:conditions>
<cp:actions>
    <ss:forward-to>
    <ss:target>my number for conference</ss:target>
    </ss:forward-to>
    </cp:actions>
    </cp:rule>
    </cp:ruleset>
</ss:conference-rule-base >
```

According to the example embodiments, once a conference has been established, any number of participating user equipments may thereafter be added to the conference. As shown in FIG. 3, a first participating user equipment 19 (User B) may send a communication request to an application server, or network node, 17 (AS B) associated with the first participating user equipment 19 (message 3). The communication request may comprise the URI or SSC associated with the initiating user equipment 11 (User A). It should be appreciated that in sending the communication request, the participating user equipment 19 (User B) may simply dial the telephone number of the initiating user equipment 11 (User A).

The network node 17 may forward the communication request, or call from the participating user equipment 19 (User B) to the initiating network node 13 (AS A) (message 4). Utilizing the complied mapping, the initiating network node 13 (AS A) may retrieve the associated conference focus identifier, and any associated rules, with the URI comprised in the communication request. Upon retrieval of the conference focus identifier, the initiating network node 13 (AS A) may forward the call, or the participating user equipment 19 (User B) to the conference focus hosting the IMS conference call (message 5). Thus, with the use of only three messages, or a single forwarded call, a user may be added to an existing call.

It should be appreciated that any number of users may be added to an existing conference. As illustrated in FIG. 3, a second participating user equipment 23 (User C) is added to the conference in a similar fashion as the first participating user equipment 19 (User B) (messages 6-8). It should further be appreciated that any number of existing conferences may be merged. For example, if User C is an initiating user of a separate IMS conference, upon the addition of User C, all of the participants of the separate IMS conference will be joined in the conference initiated by User A.

In the example provided in FIG. 3, the initiating user equipment 11 (User A) may end or terminate the conference call by sending a termination message to the network node 13 (AS A) (message 9). The network node 13 (AS A) may in turn forward the termination message to the conference focus unit 15, which may send a termination acceptance message to the network node 13 (AS A) (messages 10-11). The network node 13 (AS A) may thereafter forward the termination acceptance message to the initiating user equipment 11 (User A). Thereafter, the initiating network node 13 (AS A) may provide termination services for participating User B 19 (via messages 14-19) and participating User C 23 (via messages 20-24).

Figure 5:
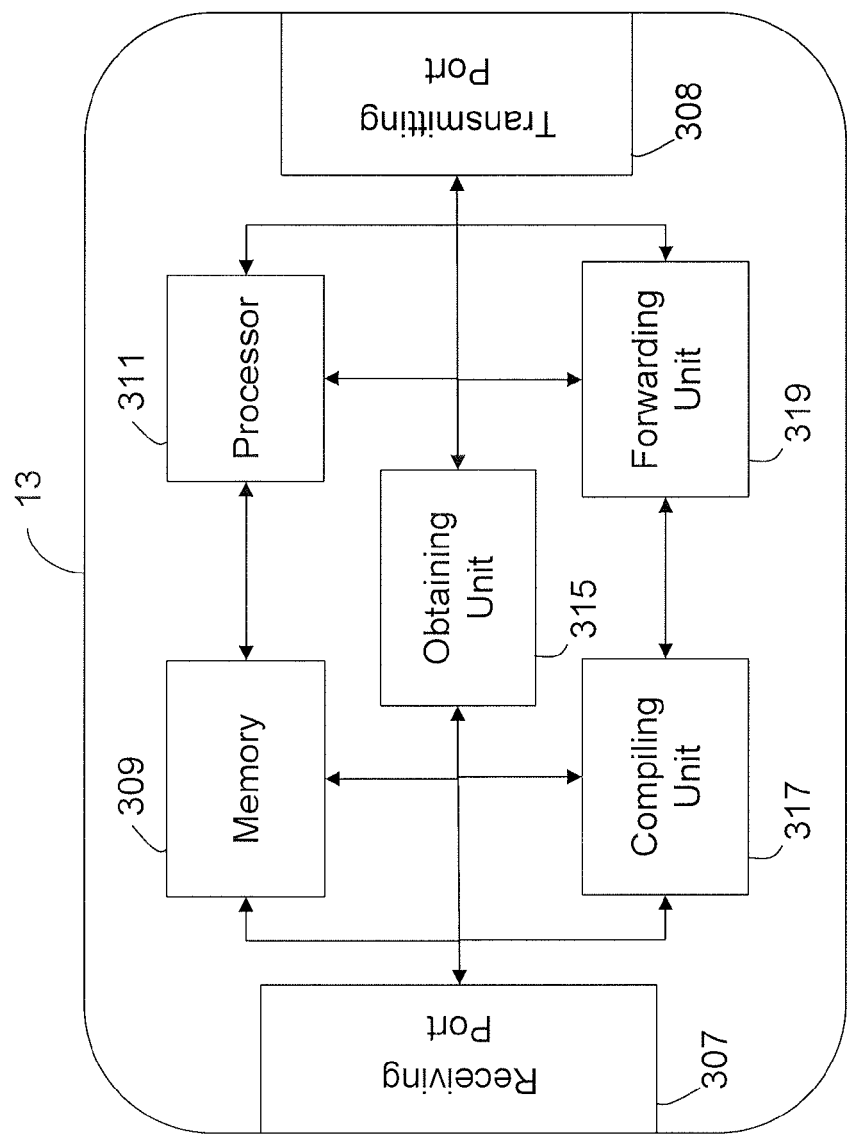
FIG. 5 is a schematic of a network node utilized in the conference creation and termination of FIG. 3, according to some of the example embodiments.

FIG. 5 is an illustrative example of a network node 13 that may be utilized in the creation, maintenance, and termination of an IMS conference, according to some of the example embodiments. In some example embodiments, the network node 13 may be located in the application server of an initiating user or may be a stand alone node in the network.

The network node 13 may comprise any number of communication ports, for example a receiving port 307 and a transmitting port 308. The communication ports is configured to receive and transmit any form of communications or conferencing data. It should be appreciated that the network node may alternatively comprise a single transceiver port. It should further be appreciated that the communication or transceiver port may be in the form of any input/output communications port known in the art.

The network node 13 may further comprise at least one memory unit 309 that may be in communication with the communication ports 307 and/or 308. The memory unit 309 may be configured to store received, transmitted, and/or measured data of any kind and/or executable program instructions. The memory unit 309 be any suitable type of computer readable memory and may be of a volatile and/or non-volatile type.

The network node 13 may also comprise an obtaining unit 315 that may be configured to obtain a conference focus identifier associated to a conference started or requested by an initiating user equipment. The network node 13 may also comprise a compiling unit 317 that may be configured to compile a mapping of the conference focus identifier an URI or SSC associated with the initiating user equipment. The network node 13 may additionally comprise a forwarding unit 319 that may be configured to forward a communications request from a participating user equipment. The network node 13 may further comprise a general processing unit 311.

It should be appreciated that the obtaining unit 315, the compiling unit 317, the forwarding unit 319 and/or the processing unit 311 may be any suitable type of computation unit, e.g. a microprocessor, digital signal processor (DSP), field programmable gate array (FPGA), or application specific integrated circuit (ASIC). It should also be appreciated that the obtaining unit 315, the compiling unit 317, the forwarding unit 319 and/or the processing unit 311 need not be comprised as separate units. The obtaining unit 315, the compiling unit 317, the forwarding unit 319 and/or the processing unit 311 may be comprised as a single computational unit or any number of units.

Figure 6:
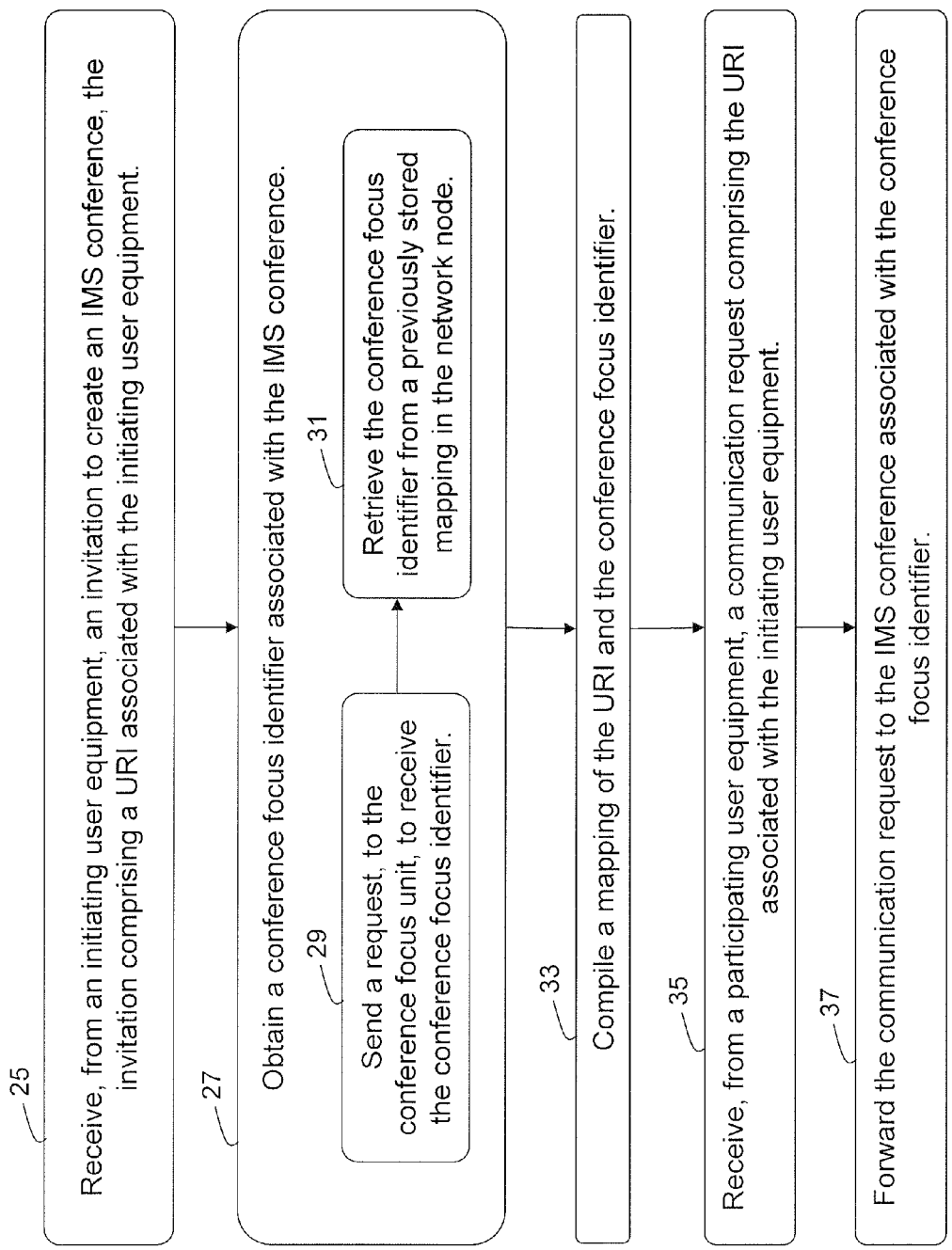
FIG. 6 is a flow diagram depicting example operations which may be performed by the network node of FIG. 5, according to some of the example embodiments.

FIG. 6 is a flow diagram illustrating example operations which may be taken by the network node 13 of FIG. 5.

Example Operation 25

According to some example embodiments, the network node 13 is configured to receive 25 an invitation, from an initiating user equipment 11, to create an IMS conference. The invitation comprises a URI associated with the initiating user equipment 11. The receiving port 307 is configured to receive 25 the invitation. An example of such an invitation may be message 1 of FIG. 3.

Example Operation 27

According to some of the example embodiments, the network node 13 is also configured to obtain 27 a conference focus identifier associated with the IMS conference. The obtaining unit 315 is configured to perform the obtaining 27.

Example Operation 29

According to some of the example embodiments, the step of obtaining 27 may further comprise sending 29 a request, to the conference focus unit 15, to receive the conference focus identifier. The transmitting unit 308 may be configured to perform the sending 29. An example of such a request may be message 2 of FIG. 3.

Example Operation 31

According to some of the example embodiments, the step of obtaining 27 may alternatively comprise retrieving 31 the conference focus identifier from a previously stored mapping 14 in the network node 13. The obtaining unit 315 may be configured to perform the retrieving 31. In such an instance, the sending of message 2, in FIG. 3, would not be required.

Example Operation 33

According to some of the example embodiments, the network node 13 is further configured to compile 33 a mapping 14 of the URI or SSC and the conference focus identifier. The compiling unit 317 is configured to perform the compiling 33.

Example Operation 35

According to some of the example embodiments, the network node 13 is configured to receive 35, from a participating user equipment 19 and/or 23, a communication request comprising the URI associated with the initiating user 11. The receiving unit 301 is configured to receive 35 the request. Examples of the communication request may be messages 4 and 7 of FIG. 3.

Example Operation 37

According to some of the example embodiments, the network node is further configured to forward 37 the communication to the IMS conference associated with the conference focus identifier, based on the mapping 14. The forwarding unit 319 is configured to perform the forwarding 37.

Thus, the example embodiments presented allow for CS users to use conferences on the IMS network. The example embodiments also allow the user to have an alternative set-up procedure to create an ad-hoc conference in IMS. Instead of creating a conference via a conference PSI, a regular URI (telephone number or SIP with an embedded telephone number) may be used, wherein such URI may also be configurable. If a telephone number or SIP with an embedded telephone URI is used then all CS users may create the IMS conference. This is not possible today for a PSI URI not containing a telephone number. It should be appreciated that the example embodiments may be applied to all forms of conference telephony, e.g., PSTN, IMS, GSM, LTE, etc. Furthermore, it should be appreciated that the URI associated with the initiating user equipment may comprise a telephone number, an E.164 number in a tel URI, Request For Comments, RFC, 3966, or a Session Initiation Protocol, SIP URI, RFC 3261, with an embedded telephone number, or a name SIP URI, RFC 3261.

Although the description is mainly given for a user equipment, it should be understood by the skilled in the art that "user equipment" is a non-limiting term which means any wireless device or node capable of participating in conference communications (e.g. PDA, laptop, mobile, etc).

The foregoing description of the example embodiments have been presented for purposes of illustration and description. The foregoing description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that any of the example embodiments presented herein may be used in conjunction, or in any combination, with one another.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

The various example embodiments described herein are described in the general context of method steps or processes, which may be implemented in one aspect by a computer program product, embodied in a computer-readable medium, including computer-executable instructions, such as program code, and executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The invention claimed is:

1. A method, performed by a network node, for conference handling, the method comprising:
    receiving an invitation, from an initiating user equipment, to create an Internet Protocol Multimedia Subsystem (IMS) conference, the invitation comprising a Uniform Resource Identifier (URI) associated with the initiating user equipment;
    obtaining a conference focus identifier associated with the IMS conference to establish the IMS conference with a conference focus;
    compiling, at the network node, a mapping of the URI associated with the initiating user equipment to correspond to the conference focus identifier;
    receiving, from a participating user equipment, a communication request comprising the URI associated with the initiating user equipment;
    utilizing the mapping, at the network node, to identify, for the participating user equipment, the conference focus identifier corresponding to the URI associated with the initiating user equipment by cross-referencing the URI associated with the initiating user equipment in the communication request to the conference focus identifier; and
    forwarding, based on the conference focus identifier obtained from the mapping, the communication request from the network node to the conference focus, for the participating user equipment to participate in the IMS conference without the participating user equipment receiving a refer message from the initiating user equipment to connect to the conference focus.

2. The method of claim 1, wherein the URI associated with the initiating user equipment comprises a telephone number, an E.164 number in a tel URI, Request For Comments (RFC) 3966, or a Session Initiation Protocol (SIP) URI, RFC 3261, with an embedded telephone number, or a name SIP URI, RFC 3261.

3. The method of claim 1, wherein the participating user equipment is a Circuit Switched (CS) user equipment.

4. The method of claim 1, wherein the network node is located within an application server or the network node is a stand alone node.

5. The method of claim 1, wherein the participating user equipment is an initiating user equipment of at least one other IMS conference and the method further comprises merging the IMS conference and the at least one other IMS conference.

6. The method of claim 1, wherein the invitation further comprises one or more of rules and policies implemented by the initiating user equipment.

7. The method of claim 6, wherein the one or more of rules and polices comprise one or more of user and call restrictions.

8. The method of claim 1, wherein the obtaining the conference focus identifier further comprises sending, to the conference focus, a request to receive the conference focus identifier associated with the IMS conference.

9. The method of claim 1, wherein the obtaining the conference focus identifier further comprises retrieving the conference focus identifier from a previously stored mapping in the network node.

10. A network node, for conference handling, the network node comprising:
    a receiving port configured to receive an invitation, from a initiating user equipment, to create an Internet Protocol Multimedia Subsystem (IMS) conference, the invitation comprising a Uniform Resource Identifier (URI) associated with the initiating user equipment;
    an obtaining unit configured to obtain a conference focus identifier associated with the IMS conference to establish the IMS conference with a conference focus;
    a compiling unit configured to compile a mapping of the URI associated with the initiating user equipment to correspond to the conference focus identifier;
    the receiving port further configured to receive, from a participating user equipment, a communication request comprising the URI associated with the initiating user equipment; and
    a forwarding unit configured to forward the communication request to the conference focus, based on the conference focus identifier obtained from the mapping, for the participating user equipment to participate in the IMS conference, in which the mapping is utilized to identify, for the participating user equipment, the conference focus identifier corresponding to the URI associated with the initiating user equipment by cross-referencing the URI associated with the initiating user equipment in the communication request to the conference focus identifier and forwarding the communication request without the participating user equipment receiving a refer message from the initiating user equipment to connect to the conference focus.

11. The network node of claim 10, wherein the URI associated with the initiating user equipment comprises a telephone number, an E.164 number in a tel URI, Request For Comments (RFC) 3966, or a Session Initiation Protocol (SIP) URI, RFC 3261, with an embedded telephone number, or a name SIP URI, RFC 3261.

12. The network node of claim 10, wherein the participating user equipment is a Circuit Switched (CS) user equipment.

13. The network node of claim 10, wherein the network node is located within an application server or the network node is a stand alone node.

14. The network node of claim 10, wherein the participating user equipment is an initiating user equipment of at least one other IMS conference, and the node merges the IMS conference with the at least one other IMS conference.

15. The network node of claim 10, wherein the invitation further comprises one or more of rules and policies implemented by the initiating user equipment.

16. The network node of claim 15, wherein the one or more of rules and polices comprise one or more of user and call restrictions.

17. The network node of claim 10, wherein the obtaining unit is further configured to request the conference focus to provide the conference focus identifier associated with the IMS conference.

18. The network node of claim 10, wherein the obtaining unit is further configured to retrieve the conference focus identifier from a previously stored mapping in the network node.

19. A non-transitory computer readable storage medium storing computer executable instructions, wherein the instructions, when executed by a processor in a network node, cause the network node to:
- receive an invitation, from an initiating user equipment, to create an Internet Protocol Multimedia Subsystem (IMS) conference, the invitation comprising a Uniform Resource Identifier (URI) associated with the initiating user equipment;
- obtain a conference focus identifier associated with the IMS conference to establish the IMS conference with a conference focus;
- compile, at the network node, a mapping of the URI associated with the initiating user equipment correspond to the conference focus identifier;
- receive, from a participating user equipment, a communication request comprising the URI associated with the initiating user equipment;
- utilize the mapping, at the network node, to identify, for the participating user equipment, the conference focus identifier corresponding to the URI associated with the initiating user equipment by cross-referencing the URI associated with the initiating user equipment in the communication request to the conference focus identifier; and
- forward, based on the conference focus identifier obtained from the mapping, the communication request from the network node to the conference focus for the participating user equipment to participate in the IMS conference without the participating user equipment receiving a refer message from the initiating user equipment to connect to the conference focus.

20. The non-transitory computer readable storage medium of claim 19, wherein the URI associated with the initiating user equipment comprises a telephone number, an E.164 number in a tel URI, Request For Comments (RFC) 3966, or a Session Initiation Protocol (SIP) URI, RFC 3261, with an embedded telephone number, or a name SIP URI, RFC 3261.

21. The non-transitory computer readable storage medium of claim 19, wherein the participating user equipment is a Circuit Switched (CS) user equipment.

22. The non-transitory computer readable storage medium of claim 19, wherein the network node is located within an application server or the network node is a stand alone node.

23. The non-transitory computer readable storage medium of claim 19, wherein the participating user equipment is an initiating user equipment of at least one other IMS conference, and the instructions further comprise instructions that when executed by the network node, cause the network node to merge the IMS conference and the at least one other IMS conference.

24. The non-transitory computer readable storage medium of claim 19, wherein the invitation further comprises one or more of rules and policies implemented by the initiating user equipment.

25. The non-transitory computer readable storage medium of claim 24, wherein the one or more of rules and polices comprise one or more of user and call restrictions.

26. The non-transitory computer readable storage medium of claim 19, wherein the instructions that cause the network node to obtain the conference focus identifier further comprise instructions, which when executed by the network node, cause the network node to send to the conference focus a request to receive the conference focus identifier associated with the IMS conference.

27. The non-transitory computer readable storage medium of claim 19, wherein the instructions that cause the network node to obtain the conference focus identifier further comprise instructions, which when executed by the network node, cause the network node to retrieve the conference focus identifier from a previously stored mapping in the network node.

* * * * *